July 1, 1969      J. B. GRIFFO      3,452,596
FLOW METER CALIBRATION APPARATUS
Filed April 3, 1967
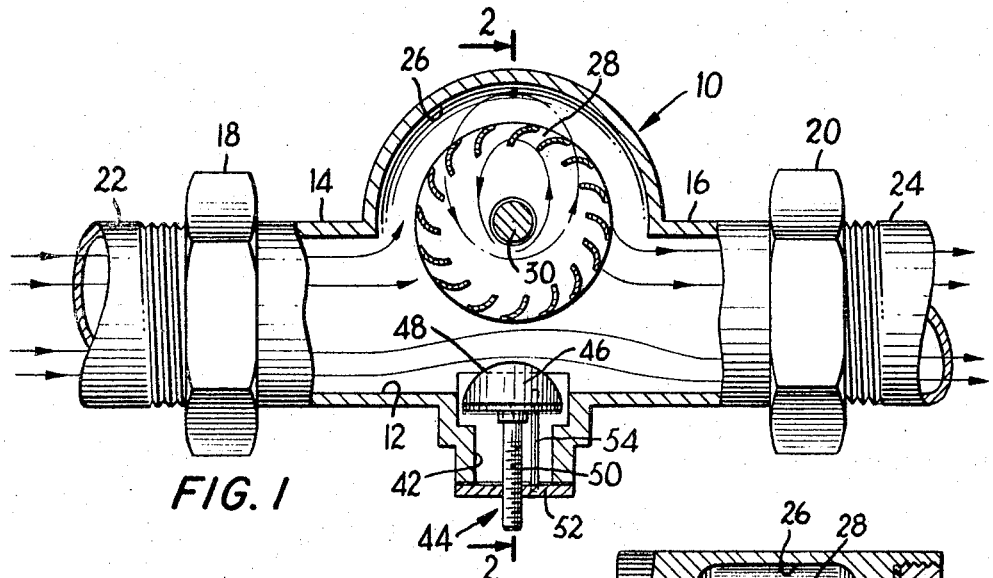
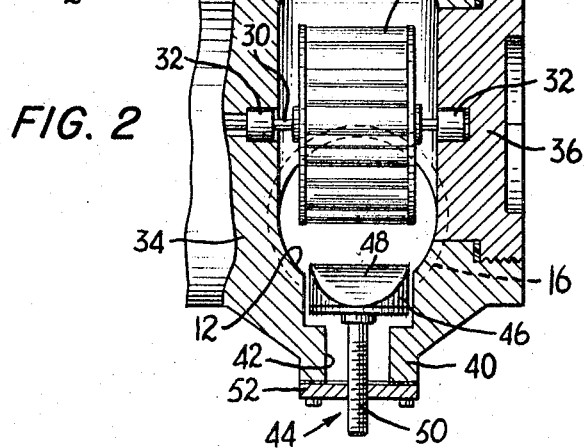
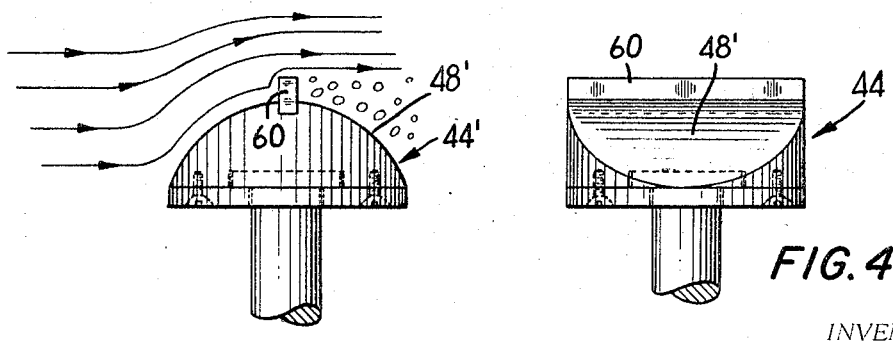
INVENTOR.
JOSEPH B. GRIFFO
BY
his      ATTORNEYS

United States Patent Office 3,452,596
Patented July 1, 1969

---

3,452,596
FLOW METER CALIBRATION APPARATUS
Joseph B. Griffo, Woodstock, N.Y., assignor to Rotron Incorporated, Woodstock, N.Y., a corporation of New York
Filed Apr. 3, 1967, Ser. No. 627,805
Int. Cl. G01f *25/00*
U.S. Cl. 73—230                                          7 Claims

ABSTRACT OF THE DISCLOSURE

Calibration apparatus for changing the meter factor of a rotor-type flow meter, such as a vortex velocity-flow meter or a Pelton wheel meter, comprising a calibration plug located in the flow passage of the meter generally opposite the rotor and mounted for adjustment toward and away from the axis of the passage to vary the velocity of the flow through the passage and thereby the rate of rotation of the rotor for a given volume flow rate. The plug includes a body projecting into the passage and having a smoothly curving convex surface facing inwardly. The plug may also be provided with a shear plate disposed at the apex of the convex surface to keep the boundary layer turbulent and avoid transitions between laminar and turbulent boundary layers in the fluid flow.

Background of the invention

This invention relates to velocity-flow meters such as the Pelton wheel or the vortex type and, more particularly, to calibration apparatus for changing the meter factor of the flow meter.

Rotor-type flow meters provide measurements of fluid flow rates by using a bladed wheel, or rotor, to detect the rate of flow in the vortex. For example, in a vortex velocity-flow meter, the rate of rotation of fluid flowing in a vortex established in a vortex flow chamber can, with proper design of the elements of the flow meter, be made to have a linear relation to the velocity of fluid flowing through the conduit. Therefore, the number of revolutions of the rotor can be counted by coupling it mechanically or electrically to a suitable counting mechanism or instrument and converted by multiplying by a scale factor in the counter mechanism the number of revolutions times the meter factor to yield the value of the volumetric fluid flow. United States Patent No. 2,906,121 for "Flow Meter" to B. A. Knauth describes and shows an exemplary vortex velocity-flow meter of the type with which the present invention is concerned.

As mentioned above, the rate of rotation of the rotor should be a linear function of the velocity of fluid flow through the meter passage. As described in United States Patent No. 3,091,118 to A. B. Hubbard for "Vortex Flow Control Device" (assigned to the assignee of the present invention and application), the flow through a vortex velocity-flow meter includes, in addition to the vortex flow, essentially three fluid flow systems, namely, the main flow measured by the vortex, the bypass flow separated from the main flow, and the shunt flow consisting of fluid entering and leaving the vortex. These flow systems are interrelated, and the design of the meter must take into account all three of them. The Hubbard patent discloses a flow meter which is constructed to provide optimum precision and includes elements for controlling each of the flow systems mentioned above.

Summary of the invention

The present invention relates to calibration apparatus for rotor-type flow meters, including not only vortex velocity-flow meters but also Pelton wheel meters, which permits the meter factor to be changed to provide optimum operation over a range of conditions by varying the several flow conditions obtaining in the meter. As will be apparent from the following description, the calibration apparatus of the invention has the important advantage of being not only effective as far as providing good calibration of the meter but also of being inexpensive. More particularly, the calibration apparatus of the invention comprises a calibration plug positioned in the meter flow passage so as to be adjustable movable toward and away from the axis of the passage. The mounting arrangement preferably includes a threaded mounting piece coupled to the plug body and a key bar or the like for preventing rotational movement of the plug as it is adjusted toward and away from the rotor. The surface of the plug facing the rotor is convex and smoothly curved so as to provide a smooth flow profile over it. In some instances it may be advantageous to provide a shear plate at the apex of the calibration plug surface to keep the boundary layer turbulent in the flow passage, thereby avoiding transitions between laminar and turbulent boundary layers. The operation of the calibration plug is to create a variable venturi action adjacent the rotor, increasing or decreasing the velocity of fluid flow through the passage. The velocity change in the flow system is detected by the rotor, and therefore at a constant volume-flow rate the rate of rotation of the rotor per unit volume of vortex fluid flow can be appropriately changed to provide a meter reading that is proportional to volume flow.

Brief description of the drawing

For a better understanding of the invention, reference may be made to the following description of exemplary embodiments, taken in conjunction with the figures of the accompanying drawing, in which:

FIG. 1 is a side view of the meter, substantially all of the meter being shown in section taken generally along a bisector plane;

FIG. 2 is an end view in section of the embodiment of FIG. 1, the view being taken generally along the lines 2—2 of FIG. 1 and in the direction of the arrows;

FIG. 3 is a side elevational view of another embodiment of the calibration plug, this embodiment including a shear plate; and FIG. 4 is an end view in elevation of the embodiment of the calibration plug of FIG. 3.

Description of the exemplary embodiments

Referring to FIGS. 1 and 2, the flow meter includes a housing, which is designated generally by the reference number 10 in the drawings, having a passage 12 which includes tubular end members 14 and 16 having threaded couplings 18 and 20 adapted to receive pipe sections 22 and 24 of the conduit through which the fluid flow being measured is taking place. Located generally centrally in the housing 10 is an enlarged vortex flow section 26, annular in elevation, where the vortex fluid flow is created. The vortex flow imparts rotation to a finned wheel or rotor 28 carried by a shaft 30 journaled by bearings 32 in the side wall elements 34 and 36 of the housing 10. The shaft 30 extends through the left wall element 34 (with respect to FIG. 2) and is coupled to a suitable electrical or mechanical counter mechanism (not shown) which counts the number of revolutions made by the rotor 28 and either produces a visible reading on a readout mechanism or an electrical signal which can be recorded or otherwise transformed to usable form.

The wall of the housing 10 that is directly opposite from the rotor 28 is formed with a flange nipple 40 which defines a receptacle 42 for a calibration plug 44. The calibration plug 44 includes a body portion 46 which is oval shaped in plan (as viewed from the top in either FIG. 1 or FIG. 2) and is formed with a smoothly curving convex upper surface 48 (the surface facing the rotor 28) generated by lines substantially parallel to the axis of the rotor shaft 30. The calibration plug 44 is located so that it is bisected by a plane through the rotor axis and perpendicular to the axis of the longitudinal meter passage 12, and the surface 48 is symmetrical about that plane, but effective results can be obtained when the plug is located upstream or downstream from this plane in the region of the rotor, so long as the flow pattern through the meter is altered by the plug.

The body 46 of the calibration plug 44 is mounted on a rod or shaft 50 which is threaded into a plate 52 fastened to the end of the nipple 40. A swivel connection of a suitable form (such as a two part construction of the body and a flanged arrangement of the shaft as shown in FIGS. 3 and 4) is provided between the body 46 and the shaft 50 so that upon rotation of the shaft and the consequent threading of the plug toward and away from the rotor 28, the plug body 46 may be kept from rotating, such as by means of a key pin 54 fixed to the plate 52 and extending into a hole formed in the plug body. In this way, the proper orientation of the plug relative to the passage is maintained, while still permitting it to be adjusted toward and away from the rotor 28.

In operation, the meter is calibrated by adjusting the position of the calibration plug 44 by appropriately turning the threaded shaft 50 to move the plug toward or away from the rotor. Depending upon the relative position of the calibration plug, a venturi effect of variable extent is provided; when the plug is closer to the rotor, the velocity of fluid flow through the meter is increased and similarly, when the plug is farther from the rotor, the velocity through the meter is decreased. Any velocity change provided by appropriate movement of the calibration plug effects the vortex flow and thus the rate of rotation of the rotor; the calibration plug thereby provides for a change in the read-out of the meter for a given flow.

FIGS. 3 and 4 show a plug 44' of a form substantially identical to that shown in FIGS. 1 and 2 except that the plug has a shear plate 60 extending widthwise across the apex of the flow surface 48'. The shear plate tends to keep the boundary layer turbulent, thus preventing transitions between laminar and turbulent boundary layers at various points along the flow path through the meter, and extends the viscosity immunity of the rotor so that it will have an increased useful range.

The embodiments in the invention described above are merely exemplary, and those skilled in the art will be able to make numerous variations and modifications of them without departing from the spirit and scope of the invention. All such variations and modifications are intended to be included within the scope of the invention as defined in the appended claims.

I claim:
1. In a flow meter having a rotor at least partially disposed in a passage where the fluid flow being measured occurs, calibration apparatus comprising a calibration plug having a body part located to partially project into the passage and having a smoothly curved convex surface facing the passage axis, the convex surface of the plug body being symmetrical about a plane perpendicular to the flow passage and passing through the axis of rotation of the rotor, and means mounting the plug in the passage for adjustable movement toward and away from the axis of the passage whereby the body part of the plug projects into the fluid flow in the passage to a predetermined adjusted position relative to the passage axis and alters the profile of the fluid flow such that the meter factor is varied according to a change in position of the plug, the flow path through the passage being free of obstructions in the zone between the plug and the rotor tending to divert the flow in the said zone.

2. In a flow meter having a rotor at least patrially disposed in a passage where the fluid flow being measured occurs, calibration apparatus comprising a calibration plug having a body part located to partially project into the passage and having a smoothly curved convex surface facing the passage axis, a shear plate mounted on the body part of the calibration plug at substantially the apex of the convex surface and arranged to maintain a turbulent boundary layer and avoid transitions between laminar and turbulent flow in the fluid flowing through the passage, and means mounting the plug in the passage for adjustable movement toward and away from the axis of the passage, whereby the plug projects into the fluid flow to a predetermined adjusted position relative to the passage axis and alters the profile of the fluid flow such that the meter factor is varied according to a change in position of the plug, the flow passage through the meter being free of obstructions in the zone between the calibration plug and the rotor tending to divert the flow in the said zone.

3. A flow meter comprising a substantially straight and unobstructed flow passage where the fluid flow being measured occurs, a rotor disposed with at least a portion thereof projecting into the flow passage and adapted to be rotated by the flow fluid therethrough, a calibration plug having a body part located to partially project into the passage and having a smoothly curved convex surface facing the passage axis, and means mounting the plug in the passage for adjustable movement toward and away from the axis of the passage whereby the plug projects into the fluid flow to a predetermined adjusted position relative to the passage axis and alters the profile of the fluid flow such that the meter factor is varied according to a change in position of the plug, the flow path being free of obstructions in the zone between the plug and the rotor tending to divert the flow in the said zone.

4. A flow meter calibration apparatus according to claim 3 wherein the plug body is oval-shaped in plan.

5. A flow meter calibration apparatus according to claim 3 wherein the convex surface on the plug body is generated by lines parallel to the axis of rotation of the rotor.

6. A flow meter calibration apparatus according to claim 3 wherein the convex surface of the plug body is symmetrical about a plane perpendicular to the flow passage and passing through the axis of rotation of the rotor.

7. A flow meter calibration apparatus according to claim 3 wherein the calibration plug further comprises a shear plate located substantially at the apex of the convex surface and arranged to maintain a turbulent boundary layer and avoid transitions between laminar and turbulent boundary layers in the fluid flow through the passage.

References Cited

UNITED STATES PATENTS

| 173,693 | 2/1876 | Taylor | 73—203 X |
| 197,949 | 12/1877 | Swartz | 73—230 |
| 2,845,798 | 8/1958 | Knauth | 73—230 |

FOREIGN PATENTS

| 478,001 | 5/1927 | Germany. |
| 927,234 | 5/1955 | Germany. |

RICHARD C. QUEISSER, Primary Examiner.

EDWARD D. GILHOOLY, Assistant Examiner.

U.S. Cl. X.R.

73—3